UNITED STATES PATENT OFFICE.

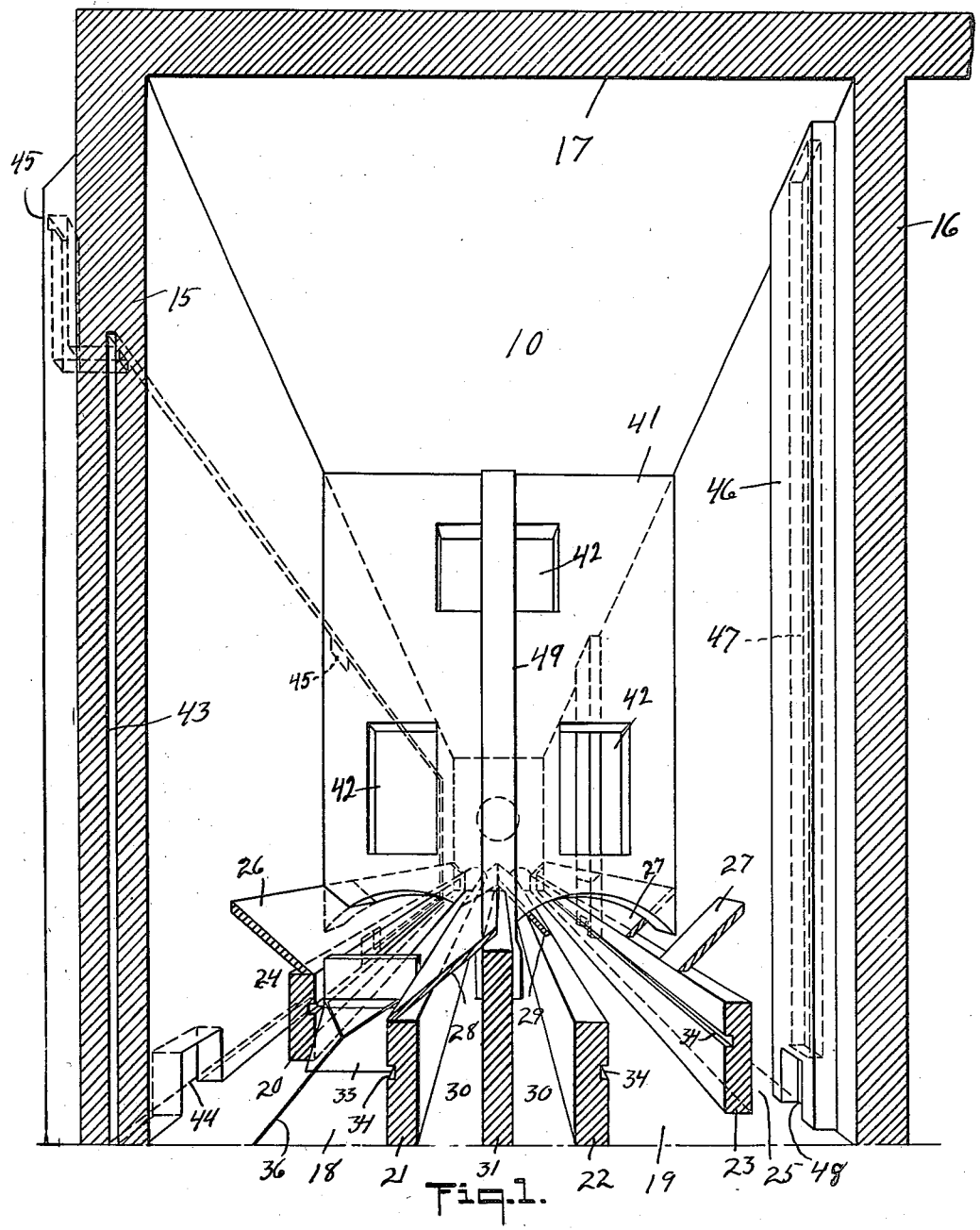

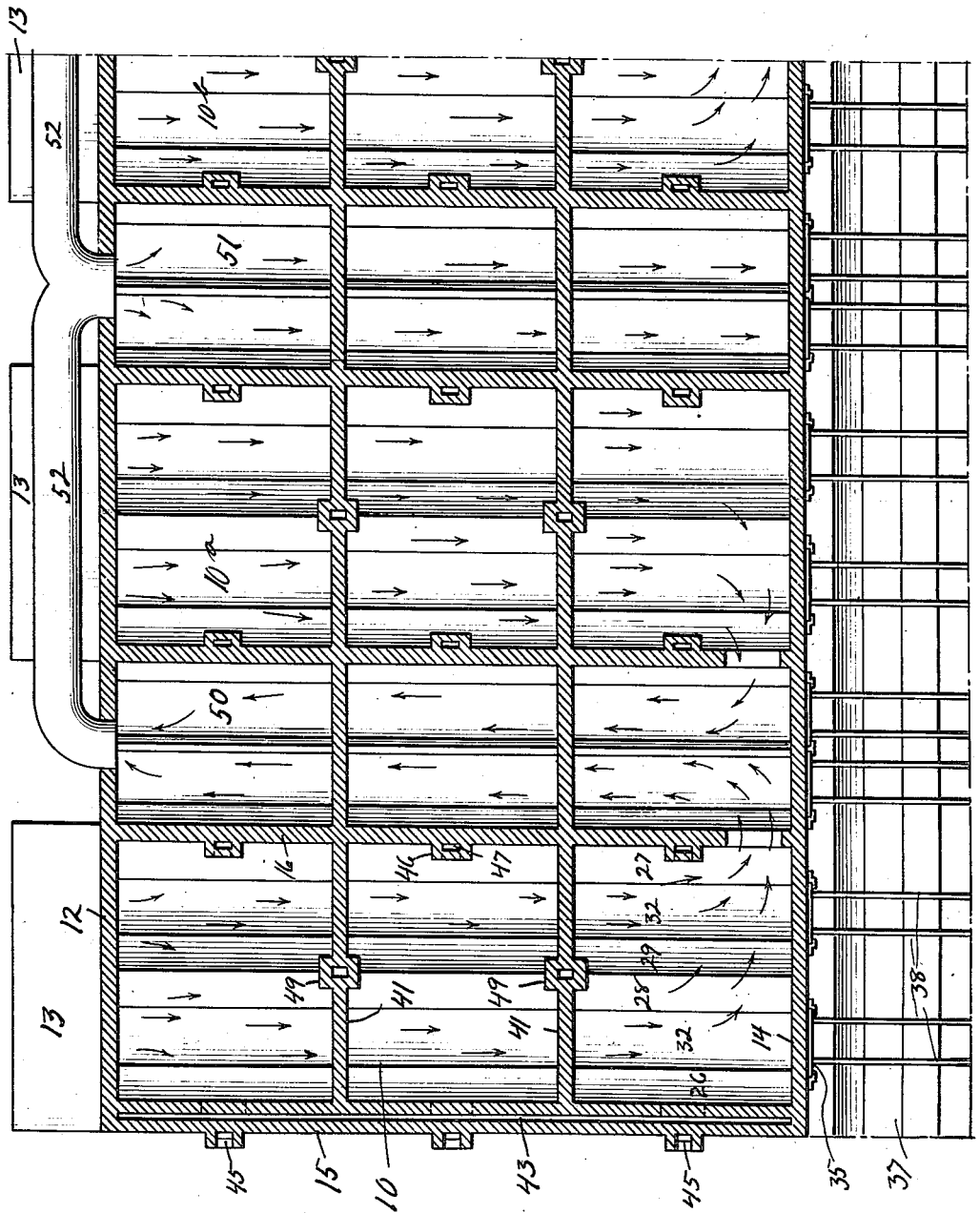

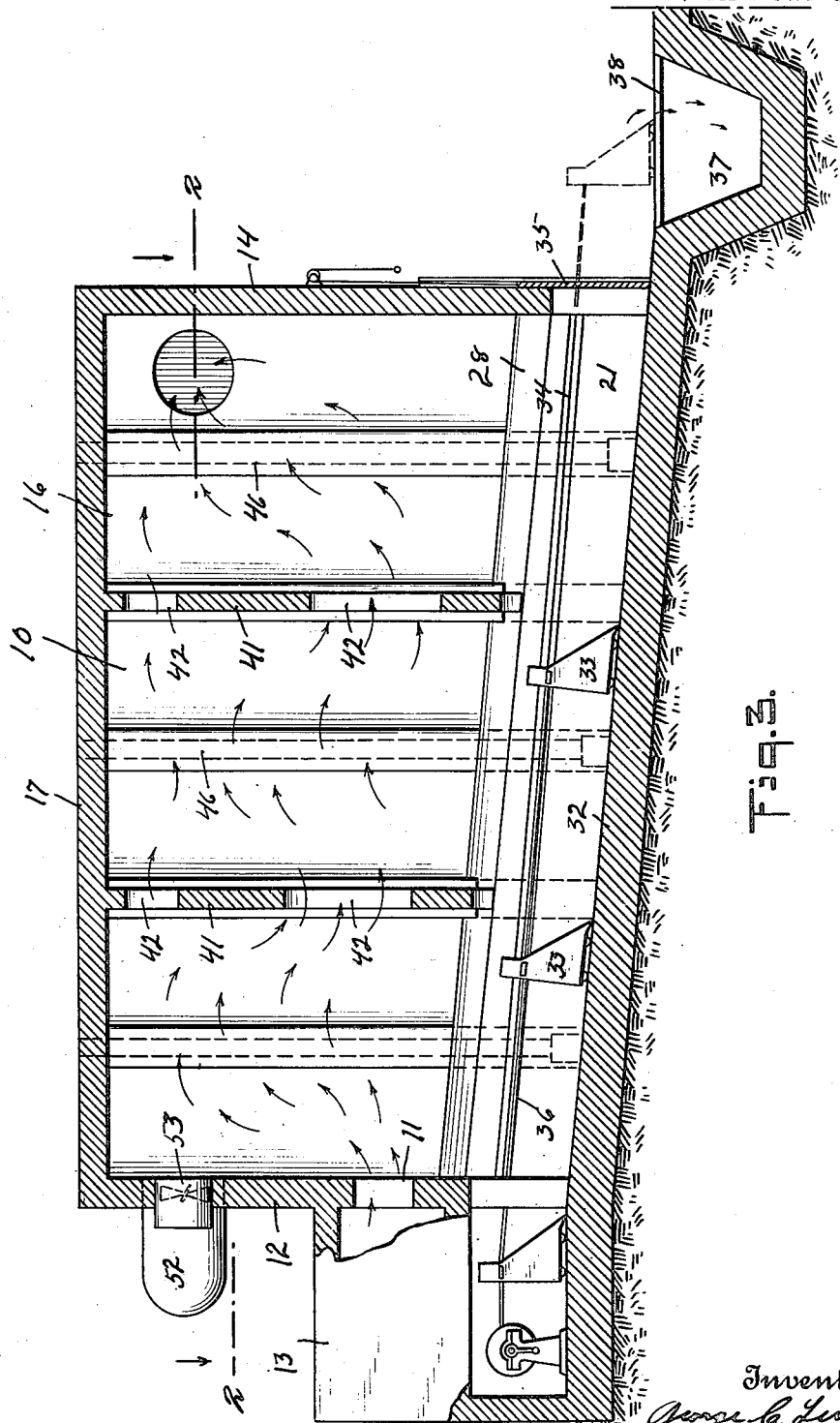

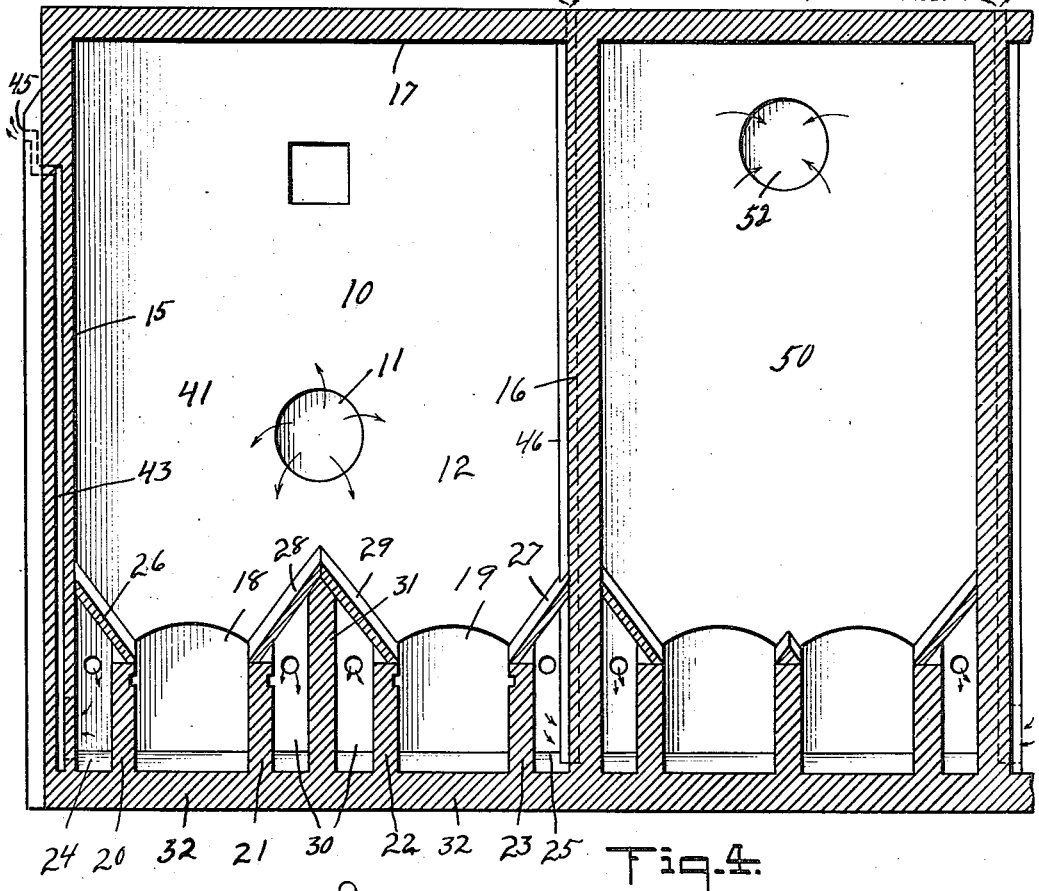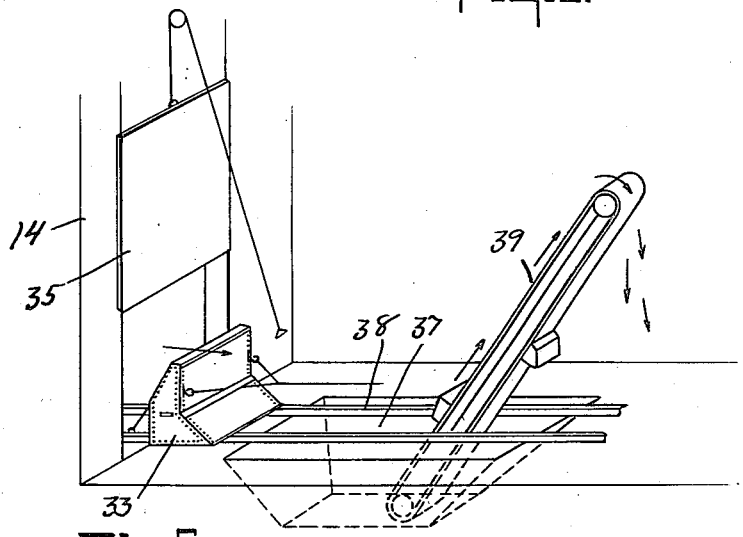

GEORGE C. LEWIS, OF NEW YORK, N. Y.

APPARATUS FOR DEPOSITION AND COLLECTION OF SUSPENDED MATTER IN GASES.

1,402,302.  Specification of Letters Patent.  Patented Jan. 3, 1922.

Application filed March 18, 1920. Serial No. 366,796.

*To all whom it may concern:*

Be it known that I, GEORGE C. LEWIS, a subject of the King of England, and a resident of New Dorp, Staten Island, city of New York, borough and county of Richmond, and State of New York, have invented certain new and useful Improvements in Apparatus for Deposition and Collection of Suspended Matter in Gases, of which the following is a specification.

The apparatus may be used for the deposition and collection from gases of flowers of sulphur, naphthalene, carbon or various other materials. The material, carried by the gases or fumes, may be finely subdivided solid particles or vaporized particles and may be produced by volatilization, sublimation, chemical reaction or other processes. The invention particularly contemplates such materials as will separate from a gaseous carrying medium in solid form rather than as a liquid which later solidifies or crystallizes.

As my invention is not restricted in its use to any particular substance or material, it will be evident that in designing or building an apparatus embodying my invention the details of construction and relative proportions of the parts may be widely varied in accordance with the specific character and properties of the particular substance or material to be separated and collected.

In carrying out my invention I provide means whereby the velocity and temperature of the gases carrying the dust-like or other solid material to be separated and collected may be varied to facilitate or control the separation. I also provide means whereby the separated material will settle by gravity into grooves or troughs along which it may be caused to move out of the separation chamber without the necessity of workmen entering the chamber.

The gases or fumes drawn from, or delivered from, the furnace or other apparatus in which the suspended matter is formed or volatilized, are delivered to a large deposit chamber and expanded to lower their temperature and velocity thus aiding the precipitation of the solid particles to the bottom of the chamber. The chamber walls may be heated or cooled to maintain the desired temperature, for instance to prevent condensation of moisture or reduce the liability of combustion, and a plurality of chambers may be arranged in series with restricted communications therebetween to give successive acceleration and retardation of the velocity.

In its preferred embodiment the bottom of the main chamber or of each of the chambers has one or more troughs and inclined floor or bottom wall portions above and at the sides thereof inclined at an angle to the horizontal not less than the angle of repose of the particular material to be deposited and collected. Thus the material upon separating or settling from the air or other noncondensing gaseous carrying medium reaches the bottom of the trough or troughs by the action of gravity alone. The bottom wall of each trough is preferably inclined in direction of its length and means are provided for facilitating the flow of the collected material lengthwise of the trough or troughs to the exterior of the separating and collecting chamber.

In the accompanying drawings:

Figure 1 is a transverse section through one chamber, the parts being shown in section and different parts being broken away at different transverse planes;

Figure 2 is a transverse section through the left hand one-half of a complete series of chambers, said section being taken approximately on the line 2—2 of Fig. 3;

Figure 3 is a longitudinal section through one of the chambers;

Figure 4 is a transverse section through the two left hand sections; and

Figure 5 is a perspective of a portion of the removing mechanism.

In my improved apparatus I employ a separation and collection chamber 10 which may be of any desired size. It is preferably very much longer than it is high or wide and has an inlet 11 in one end wall 12 through which the gases or fumes carrying the suspended matter may be delivered. Outside of the chamber adjacent to the end wall 12 I have shown conventionally a furnace 13 in which the material to be collected is produced or put in a state of suspension in the gases or fumes. This furnace or other equivalent producing apparatus will, of course, vary with the character of the material with which my invention is employed. The chamber is shown as having a second end wall 14, side walls 15 and 16 and a roof or top wall 17. The entire bottom between the opposite side walls 15 and 16 is formed with one or more grooves and inclined surfaces for directing the material, by gravity, into said grooves. As shown, there are two of these grooves 18 and 19 between substantially parallel vertical walls 20, 21, 22 and 23. The depth and width of these grooves may vary with the size and proportions of the chamber, the character of the material to be delivered and the frequency with which it is desired to remove the collected material from the chamber. The side walls 20 and 23 of the grooves are spaced from the side walls 15 and 16 respectively so as to form passages 24 and 25. These are covered by inclined walls 26 and 27, the inclination of which is steeper than the angle of repose of the material to be collected. The other two groove walls 21 and 22 serve to support oppositely and downwardly inclined walls 28 and 29 which meet at an angle and deliver laterally and in opposite directions to the grooves 18 and 19 the material collecting thereon. Thus all material settling in the chamber falls either directly into the grooves or onto the inclined walls 26, 27, 28 and 29 and is guided by the latter into the grooves. Between the vertical walls 21 and 22 and beneath the inclined walls 28 and 29 there is formed a passage 30. This may be divided longitudinally by a partition or series of supports 31 supporting the upper meeting edges of the inclined walls 28 and 29.

To facilitate the removal from the grooves of the deposited material, the bottom walls 32 of the grooves are preferably inclined lengthwise of the chamber so that there is a tendency of the material, if it be extremely light, to flow or move toward the end wall 14 of the chamber. One or more scoops 33 are provided for each groove and these may be of a width and heighth substantially equal to the cross-sectional dimensions of the grooves. The scoops may be guided, or their movement facilitated, by suitable bearings or supporting means. As shown, the side walls 20, 21, 22, and 23 of the grooves are provided with laterally facing grooves 34 serving as tracks for rollers or shoes projecting from the ends of the scoops.

The end walls 12 and 14 are provided with openings at the opposite ends of the grooves and these have doors or closures 35. The scoops are normally disposed outside of the chamber at the upper end of their respective grooves and when it is desired to remove the material from the chamber, the doors 35 are opened and the scoops caused to enter the chamber at the upper end of the grooves and move lengthwise thereof and out at the lower end carrying the material along in front of them. If the material is extremely light and the pitch of the bottom walls 32 sufficiently steep, the scoops may move down by gravity and may then be pulled back by suitable cables 36. The scoops may be heavily weighted to facilitate this movement by gravity. If desired, the cables 36 may be used to not only pull the scoops back to the upper end but also for pulling them down to the lower end and out of the wall 14 with the material. Extending transversely of the chamber and outside of the end wall 14 there may be provided a transverse trough into which the scoops deliver the material. As shown, tracks 38 extend across a trough or collection pit 37 and the material may be removed from the pit in any suitable manner, as for instance by an endless conveyer 39.

If desired a plurality of scoops may be provided for each chamber particularly if the latter be of great length and these may be connected together by the cables 36 and certain of the scoops remain in the chamber at spaced points along the length thereof during the depositing of the material. Upon opening the doors 35 and winding the cable from the lower end, all of the scoops will be moved and they will emerge at the lower end in succession, each with its separate load of material.

As the gases enter the chamber from the furnace through the inlet 11 they expand and their velocity greatly decreases. The expansion tends to cool the gas and this cooling together with the drop in velocity facilitates the depositing of the suspended matter. Successive expansions and changes in the velocity of flow may be secured by means of partitions 41 extending transversely of the chamber. These partitions may have ports 42 for the gases and through which the gases flow at higher velocity than while traveling through the body portion of the chamber. These partitions at their lower ends terminate at a sufficient distance above the grooves so as not to interfere with the movement of the material along the latter. The partitions may be omitted, if desired.

With some materials it is desirable to control the temperature of the chamber, for instance by warming it, to prevent reduction of temperature below the dew point so as to prevent condensation of moisture or by cooling it to facilitate deposition of the material or reduction of the liability of combustion of the material. For this purpose I have shown the outer wall 15 of the chamber provided with air space 43 communicating with the passage 24 by ports 44 and opening to the atmosphere at the upper end through one or more ports 45. The wall 16 is shown as having pilasters 46 with vertical passages 47 communicating through ports 48 with the passage 25 at the lower end and opening to the atmosphere at the upper end.

Columns or pilasters 49 may be arranged along the center line of the chamber and have passages opening at the upper end to the atmosphere and at the lower end to the passage or passages 30. Heated or cooled air may be forced lengthwise of the passages 24, 25 and 30 through ports at the ends thereof and may escape upwardly through the vertical passages to the atmosphere. Thus lowering of the temperature may be retarded or accelerated at will.

In the foregoing description I have referred to only a single unit. For facilitating the complete separation and deposition of some materials I employ a plurality of chambers arranged in series. In Figure 2 I have shown such a series with certain of the chambers at one end omitted, as they may be duplicates of those at the other end. In the arrangement here illustrated I employ four primary chambers, each with its own individual furnace, and all arranged parallel but spaced apart. Between the terminal chamber 10 and the adjacent chamber 10ª, I provide a chamber 50, and between the two intermediate chambers 10ª I provide a chamber 51. The gases may flow in the same directions through all of the chambers 10 and 10ª, and may flow back in the opposite directions through the chambers 50 having passed from one chamber to the next by suitable ports or openings in the partition walls and adjacent to the end walls 14. From the chambers 50 the gases may be drawn by fans or blowers and delivered through conduits 52 to the middle chamber 51 and flow in the same direction as in the primary chambers. The gases, by the time they reach the end of the chamber 51, may have lost substantially all of their suspended matter and may be discharged directly to the atmosphere or may be passed through cloth filters or any other suitable apparatus. The collection trough or pit 37 may extend lengthwise of the entire chamber and all of the grooves in the several chambers may be inclined in the same direction so that material may be removed from all seven chambers to this one collecting trough or pit. It will be noted that all of the gas delivered to the four chambers 10 and 10ª passes to the two chambers 50 and from these to the single chamber 51. This permits of the desired rate of travel of the gases in the chamber 51 even though by the time they reach this chamber they are at a very much lower temperature than when they came from the furnace and thus very much reduced in volume. The troughs, as arranged in the chambers 50 and 51, may be similar to the arrangement in the primary chambers although ordinarily it is not necessary to space the troughs apart to as great a distance to provide a passage 30 therebetween. Thus a single wall 52 may separate adjacent troughs and have an inclined upper edge to prevent accumulation of the material on the upper edge of the partition wall.

All of the passages between the collecting grooves or troughs and in the partition walls may have suitable dampers for controlling the flow of the cooling or heating gases and forced draft may be given by the ordinary means, such for instance as suction or pressure blowers. The closing of the dampers to the air space 43 causes said air space to serve as a heat insulating space and to prevent cooling of the inner surface of the wall 15 by radiation to the atmosphere at the outer surface. When the desired amount of material has been collected, cool air may be forced through all of the passages to properly reduce the temperature before starting the scoops in operation. Where transverse partition walls and a plurality of scoops are employed, each scoop may be normally held directly beneath a corresponding partition during the depositing of material. Any desired means may be provided for facilitating the rapid ventilation of the chambers in case it is necessary for workmen to go inside. For this purpose ventilation openings may be provided in the end and top walls and suction fans or pressure blowers used to connect therewith.

Having thus described my invention what I claim as new and desire to secure by Letters Patent is:

1. An apparatus for the deposition and collection of matter suspended in gases including a chamber having a trough extending lengthwise thereof, longitudinally extending walls laterally inclined downwardly to the upper edges of said trough, and passages extending lengthwise of the chamber upon opposite sides of said trough and beneath said inclined walls for the circulation of temperature controlling medium.

2. An apparatus for the deposition and collection of matter suspended in gases including a chamber having a top wall, end walls, side walls and a bottom wall, the bottom wall having a trough extending lengthwise thereof, and surfaces laterally inclined downwardly to said trough, said end wall having openings registering with the ends of said trough, and said side walls having passages therein communicating with the spaces beneath said inclined surfaces.

3. An apparatus for treating large volumes of gases for the deposition and collection of light, finely sub-divided particles suspended therein, including a chamber having a pair of troughs extending lengthwise of the bottom thereof, longitudinally extending walls laterally inclined from said side walls to said trough and a pair of oppositely disposed laterally inclined walls between said troughs, said walls being at an angle to the horizontal greater than the angle of repose of the material settling thereon, the space beneath said inclined walls serving for the circulation of a temperature controlling medium.

4. An apparatus for treating large volumes of gases for the deposition and collection of light, finely sub-divided particles suspended therein, including a chamber having a pair of troughs extending lengthwise of the bottom thereof, longitudinally extending walls laterally inclined from said side walls to said trough and a pair of oppositely disposed laterally inclined walls between said troughs, said walls being at an angle to the horizontal greater than the angle of repose of the material settling thereon, the space beneath said inclined walls serving for the circulation of a temperature controlling medium, the bottoms of said troughs being inclined in the direction of their length and scoops movable along said troughs for removing deposited material from said chambers.

5. An apparatus for treating large volumes of gases for the deposition and collection of finely sub-divided particles suspended therein, including a series of separation chambers arranged side by side, means for delivering said gases to certain of said chambers at one end of the apparatus, means for delivering gases from said first mentioned chambers to certain other chambers of said series at the opposite end of said apparatus, each of said second mentioned chambers receiving the gases from two of said first mentioned chambers, means for delivering said gases from said second mentioned chambers to another of said series at the first mentioned end of the apparatus, said third mentioned chamber receiving gases from two of said second mentioned chambers, and means for removing deposited material from all of said chambers at the second mentioned end of the apparatus.

6. An apparatus for treating large volumes of gases for the deposition and collection of light, finely sub-divided particles suspended therein, including a plurality of chambers arranged side by side and extending horizontally, means for delivering gases lengthwise of said chambers in series and in a substantially horizontal direction in each, the first chamber in the series being of greater cross sectional area than the last, means for removing deposited material substantially horizontally from all of said chambers at the same end of the apparatus, and means extending past all of said chambers for receiving said removed material.

7. An apparatus for treating large volumes of gases for the deposition and collection of light, finely sub-divided particles suspended therein, including a plurality of chambers arranged side by side, means for delivering gases lengthwise of said chambers in series, successive pairs of chambers of the series communicating at opposite ends of the apparatus whereby the flow is in one direction in certain chambers and in the opposite direction in other chambers, and means for removing the deposited material from all of said chambers at the same end of the apparatus.

8. An apparatus for treating large volumes of gases for the deposition and collection of light, finely subdivided particles suspended therein, including a plurality of chambers arranged side by side, means for delivering gases lengthwise of said chambers in series, all of said chambers having grooves extending lengthwise thereof in the direction of flow of the gases and inclined lengthwise of the chamber in the same direction, and a transverse groove outside of said chambers for receiving the material delivered from said chambers along said first mentioned grooves.

Signed at New York, in the county of New York and State of New York, this 9th day of March, A. D. 1920.

GEORGE C. LEWIS.